Figure 1:
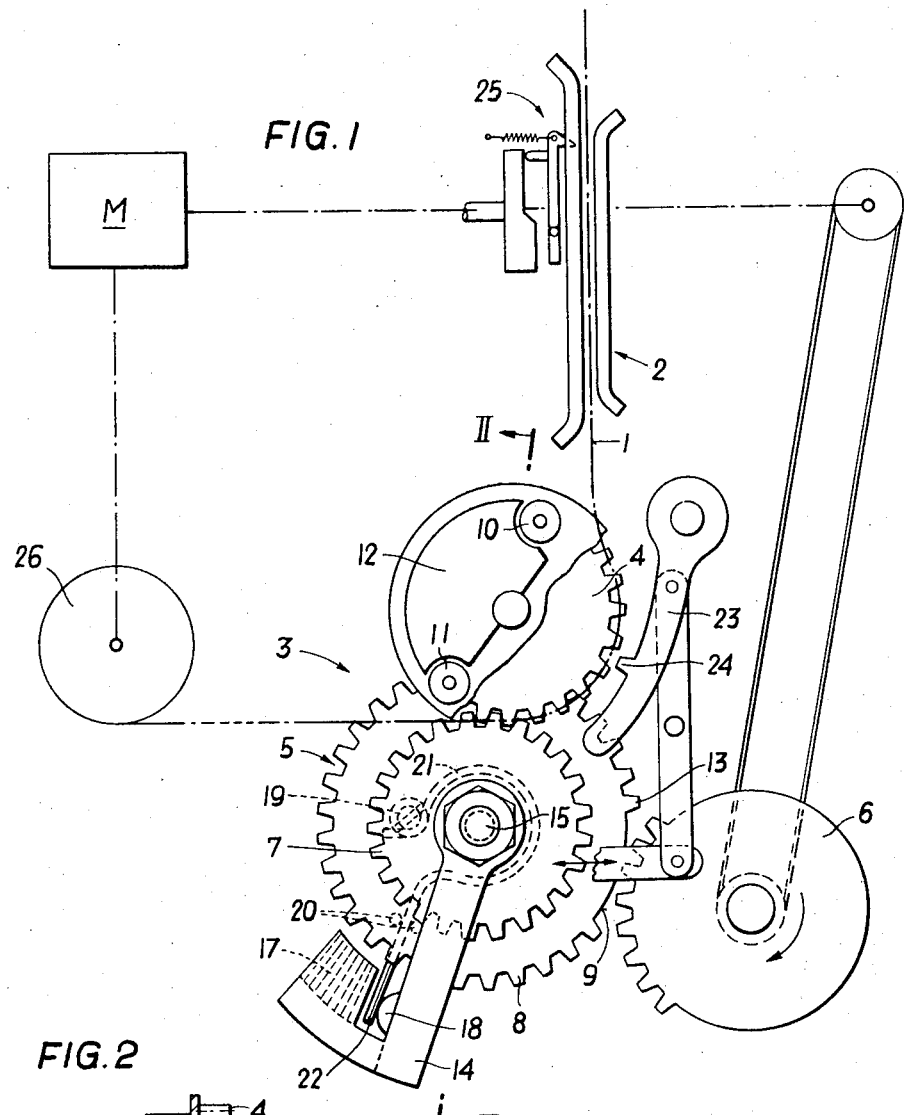

United States Patent [19]
Krob et al.

[11] 3,746,227
[45] July 17, 1973

[54] RECORDING OR REPRODUCING APPARATUS

[75] Inventors: Erwin Krob; Josef Morell, both of Vienna, Austria

[73] Assignees: Karl Vockenhuber; Raimund Hausen, both of Vienna, Austria

[22] Filed: Aug. 16, 1972

[21] Appl. No.: 281,049

[30] Foreign Application Priority Data
Aug. 19, 1971 Austria.................................... 7283

[52] U.S. Cl...................... 226/36, 226/62, 226/113, 226/115, 226/156, 352/159
[51] Int. Cl............................................. B65h 23/16
[58] Field of Search...................... 226/62, 36, 113, 226/114, 115, 156; 352/159

[56] References Cited
UNITED STATES PATENTS
3,606,124  9/1971  Ott....................................... 226/113
2,434,355  1/1948  Fairbanks............................. 226/36
3,021,039  2/1962  Michaels.............................. 226/36

Primary Examiner—Richard A. Schacher
Assistant Examiner—Gene A. Church
Attorney—Ernest G. Montague

[57] ABSTRACT

In a motion picture apparatus for perforated film including a film gate, a film claw, and means for moving the claw in-and-out and up-and-down relatively to the gate to intermittently engage the perforation of the film and to advance the film through the gate. Driving means are provided for the film and the latter forms a loose loop between the claw and the driving means. A motor is arranged to drive the driving means and the means for moving the claw. A loop restorer has an eccentric control surface, which is situated inside the loose loop formed by the film. A first toothed wheel showing a first tooth gap is connected to the eccentric control surface to drive it. The eccentric control surface is movable between a first position, in which the length of the film between the claw and the driving means has a maximum size and a second position, in which the length of the film between the claw and the driving means has a minimum size and the eccentric control surface having a rest position situated between the first position and the second position, in which rest position the control surface is out of engagement with the film in the film loop, so that a shortening film loop engaging the eccentric control surface will move it to the first position; a second constantly rotating toothed wheel, the second toothed wheel being driven by the motor in synchronism with the claw. The first tooth gap of the first toothed wheel is adjacent to the second toothed wheel, when the eccentric control surface is in the rest position. The second toothed wheel showing a second tooth gap of a range that corresponds to the part of the cycle of the claw movement, in which the claw is in engagement with the perforation of the film, whereas the second toothed wheel is toothed in a range corresponding to the part of the cycle of the claw movement, in which the claw is out of engagement with the perforation of the film.

3 Claims, 3 Drawing Figures

Patented July 17, 1973  3,746,227

RECORDING OR REPRODUCING APPARATUS

The invention relates to a recording- or reproducing apparatus for a striplike, perforated information carrier, in particular a motion picture projector, provided with a claw and a loop restorer, said loop restorer having an eccentric control surface situated in the film track in the range of the loop, which control surface is connected with a sprocket showing a tooth gap, whereby a continuously driving sprocket connected with the driving gear is arranged opposite said sprocket.

Such an arrangement has become known for instance from the US Specification No. 2,434,355. However, a considerable disadvantage of this construction was that the loop restoring arrangement worked also when the claw was just in mesh with the perforation. Jammings in the claw mechanism occurred and also damages of the perforation and film cracks respectively, were the result. Another known construction offers an improvement in that a cam controlling an elastic lever actuates a loop restorer only then when the claw is out of perforation. This construction is however very complicated and not at all solid.

According to the invention the mentioned disadvantages are avoided in that also the continuously driving sprocket shows a tooth gap in the range that corresponds with the mesh of the claw into the perforation, whereas it is toothed in the range corresponding with the backstroke of the claw.

According to an advantageous development of the invention there is provided a locking means for the drive of the loop restorer in order to avoid its actuation upon rewind operation. Said locking means is preferably connected with a mode control switch. It may advantageously be put into direct engagement with the part bearing the control surface.

Further details and features of the invention will become apparent from the specification of the embodiments schematically illustrated in the drawing.

FIG. 1 schematically shows the design of the inventive arrangement, whereby

Figure 2:
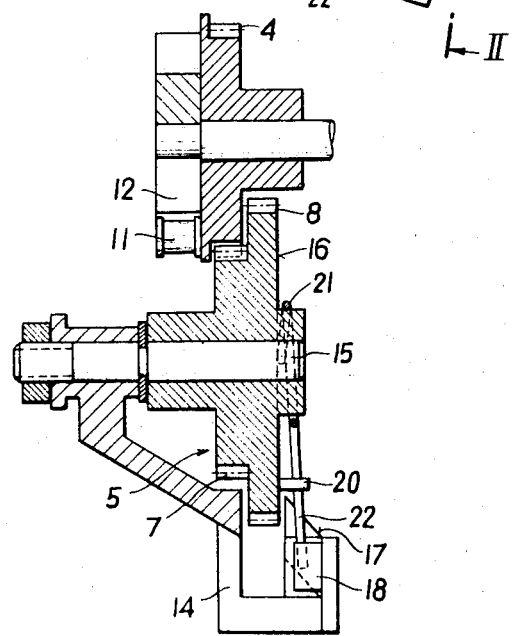

FIG. 2 illustrates a section along the line II — II of FIG. 1.

Figure 3:
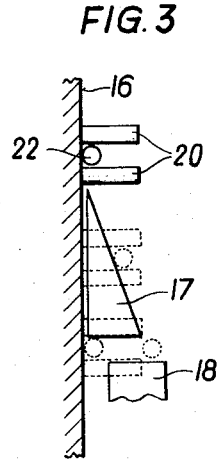

FIG. 3 displays schematically the particular positions of a locking means, which after formation of the loop keeps the sprocket connected with the control surface in a defined position.

A film 1 fed by a film claw 25 to drive means 26, both of them being controlled by a motor M, said film is led to an inventive loop restorer 3, after having passed a film gate 2 (FIG. 1). Said loop restorer substantially consists of sprockets 4, 5 and 6, whereby the sprocket 5 bears two toothed rims 7 and 8, which are in mesh with the sprocket 4 and with the sprocket 6 continuously driven by the motor M. The transmission of the sprocket 4 and the toothed rim 7 is 1 : 1. The toothed rim 8 shows a gap 9 in a part of its circumference, which is of such size that in a defined position this toothed rim 8 does not mesh with the sprocket 6. This position corresponds with the normal position of the gear, where no new loop is formed. On the other hand the sprocket 6, which runs in synchronism with the claw 25, is only toothed in that range, which corresponds with the backstroke of the claw 25. The loop restorer is disposed on a front surface of the sprocket 4. Two rollers 10, 11 pivotally arranged on the same diameter of the front surface, but radially opposed, include a cam 12, which eccentrically extends over half of the front surface.

If now for some reason the film loop is reduced, the film 1 abuts the roller 11 and deviates the sprocket 4 and therewith also the sprocket 5 so far that a tooth 13 of the toothed rim 8 comes in the range of the continuously driven sprocket 6, driven in clockwise sense corresponding to the forward run illustrated in FIG. 1. As long as the claw 25 engages the perforation, the part of the sprocket 6 without toothed rim passes along the tooth 13. Only as soon as the claw 25 performs the backstroke, the toothed rim of the sprocket 6 meshes with the tooth 13 and transmits the torque of the sprocket 5 and to the sprocket 4 respectively. The cam 12, which referring to FIG. 1 is also deviated in clockwise sense, abuts the film 1 and forms a new loop. After half a revolution of the sprocket 5 and of the sprocket 4 the tooth gap of the sprocket 6 comes in the range of the toothed rim 8 and interrupts the transmission of the torque until the toothed part of the sprocket 6 again meshes with the toothed rim 8. After a further half revolution, the gap 9 again reaches its initial position, in which the drive connection between the sprockets 5 and 6 is finally interrupted.

It however may occur that due to the centrifugal force the sprocket 5 would continue to rotate and that the tooth 13 would again come in the range of the sprocket 6. In order to prevent this, a locking means is provided on the sprocket 5, which holds the loop restorer 3 in the rest position as shown in FIG. 1. A link 14 (FIG. 2) of the locking means is fixed to the shaft 15, which at the same time is the axis of rotation of the sprocket 5, and extends to the front surface 16 of the sprocket 4 averted from the bearing of the link 14. The link 14 is provided on its free end with a slope 17, which in a certain interval is followed by a stop face 18.

On the front surface 16 of the sprocket 5 a spring wire 21 is mounted by means of a screw 19 and two guide pins 20, the free end 22 of which protrudes the circumference of the sprocket 5. Upon revolution of the sprocket 5 the spring 21 is taken along until finally the free arm 22 is removed from the front surface 16 by means of the slope 17, however without exceeding the guide formed by the two pins 20 (FIG. 3). Finally the arm 22 abuts the stop face 18 of the standing link 14, stops at the same time the sprocket 5 in that position in which the tooth gap 9 faces the sprocket 6 and again springs back to the front surface 16 of the sprocket 5 by means of the slot formed by the slope 17 and the stop face 18.

In order to avoid an actuation of the loop restorer upon quick rewind of the film 1, there is provided a locking means 23, which is controlled by a mode control switch, not shown. This locking means 23 bears a tooth 24, which engages the toothed rim of the sprocket 3 at the position "rewind" of the operating switch and thus blocks the sprocket 4. The film 1 abuts the pivotally arranged rollers 10 and 11 and slides over them with little friction.

The advantage of this invention consists in the solid and uncomplicated design of the described arrangement. The application of the inventive loop restorer is not limited only to cinematographic projectors, but concerns all similar apparatus, where the length of the information carrier must be kept constant between two points of the equipment.

What is claimed is:

1. In a motion picture apparatus for perforated film having a film gate;
a film claw;
means for moving said claw in-and-out and up-and-down relatively to said gate to intermittently engage the perforation of said film and to advance the film through said gate;
driving means for said film;
said film forming a loose loop between said claw and said driving means;
a motor arranged to drive said driving means and said means for moving said claw;
a loop restorer having an eccentric control surface, which is situated inside said loose loop formed by said film;
a first toothed wheel showing a first tooth gap is connected to said eccentric control surface to drive it, said eccentric control surface is movable between a first position, in which the length of said film between said claw and said driving means has a maximum size and a second position, in which the length of said film between said claw and said driving means has a minimum size and said eccentric control surface having a rest position situated between said first position and said second position, in which rest position said control surface is out of engagement with said film in said film loop, so that a shortening film loop engaging said eccentric control surface will move it to said first position;
a second constantly rotating toothed wheel, said second toothed wheel being driven by said motor in synchronism with said claw;
said first tooth gap of said first toothed wheel is adjacent to said second toothed wheel, when said eccentric control surface is in said rest position,
said second toothed wheel showing a second tooth gap of a range that corresponds to the part of the cycle of said claw movement, in which said claw is in engagement with the perforation of said film, whereas said second toothed wheel is toothed in a range corresponding to the part of the cycle of said claw movement, in which said claw is out of engagement with the perforation of said film.

2. Apparatus as set forth in claim 1, in which said claw and said driving means are operable in forward and reverse direction,
locking means, movable between an operative position, in which said first toothed wheel is arrested in said position where said first tooth gap is adjacent to said second toothed wheel,
and an inoperative position, in which said first toothed wheel is rotatable,
means arranged to move said locking means to said operative position and to hold them in said operative position, when said claw and said driving means are operable in said reverse direction.

3. Apparatus as set forth in claim 2 comprising a mode control switch adapted to control the operating direction of said claw and said driving means, said locking means being controlled by said mode control switch.

* * * * *